United States Patent
Salenbien et al.

(10) Patent No.: US 10,300,810 B1
(45) Date of Patent: May 28, 2019

(54) SEAT FLIP UP CUSHION LATCH

(71) Applicant: Ford Global Technologies, LLC, Dearborn, MI (US)

(72) Inventors: Nicholas Salenbien, Dundee, MI (US); Ken Liao, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 15/850,855

(22) Filed: Dec. 21, 2017

(51) Int. Cl.
*B60N 2/30* (2006.01)
*B60N 2/015* (2006.01)

(52) U.S. Cl.
CPC ......... *B60N 2/01583* (2013.01); *B60N 2/305* (2013.01)

(58) Field of Classification Search
CPC ............ B60N 2/01583; B60N 2/01516; B60N 2/01508; B60N 2/015; B60N 2/305; B60N 2/3045; B60N 2/304; B60N 2/3038; B60N 2/30
USPC ........................................ 297/331, 325, 326
See application file for complete search history.

(56) References Cited

U.S. PATENT DOCUMENTS

| | | | |
|---|---|---|---|
| 2,789,621 A | 4/1957 | Langtry et al. | |
| 4,880,269 A * | 11/1989 | Jensen | B60J 1/04 296/190.1 |
| 4,904,003 A * | 2/1990 | Yamazaki | B60N 2/366 292/126 |
| 4,978,158 A * | 12/1990 | Kubo | B60N 2/366 296/65.03 |
| 5,529,378 A | 6/1996 | Chaban et al. | |
| 6,805,407 B2 | 10/2004 | Iliscu | |
| 6,860,560 B2 | 3/2005 | Chiu et al. | |
| 6,945,585 B1 * | 9/2005 | Liu | B60N 2/01583 292/216 |
| 9,481,272 B2 | 11/2016 | Dlugokecki | |
| 2005/0057082 A1 * | 3/2005 | Hatta | B60N 2/01583 297/341 |
| 2005/0236862 A1 * | 10/2005 | Martone | B60N 2/01583 296/65.03 |
| 2008/0012379 A1 | 1/2008 | Miller et al. | |
| 2009/0322115 A1 * | 12/2009 | Yamada | B60N 2/06 296/65.08 |
| 2013/0147249 A1 * | 6/2013 | Champ | B60N 2/3011 297/337 |
| 2013/0221726 A1 * | 8/2013 | Kalinowski | B60N 2/01583 297/463.1 |
| 2015/0367761 A1 * | 12/2015 | Sonoda | B60N 2/3025 297/331 |

* cited by examiner

*Primary Examiner* — Mark R Wendell
(74) *Attorney, Agent, or Firm* — Vichit Chea; Price Heneveld LLP

(57) ABSTRACT

A latch assembly can be used for a vehicle seat where the latch assembly includes a cushion latch coupled to a cushion pan where the cushion latch includes a support bracket and a pin. The pin may be coupled to at least one resilient element and a pull strap. The latch assembly additionally includes a latch catch bracket coupled to a support arm where the pin of the cushion latch engages the latch catch bracket to immobilize the cushion pan.

17 Claims, 11 Drawing Sheets

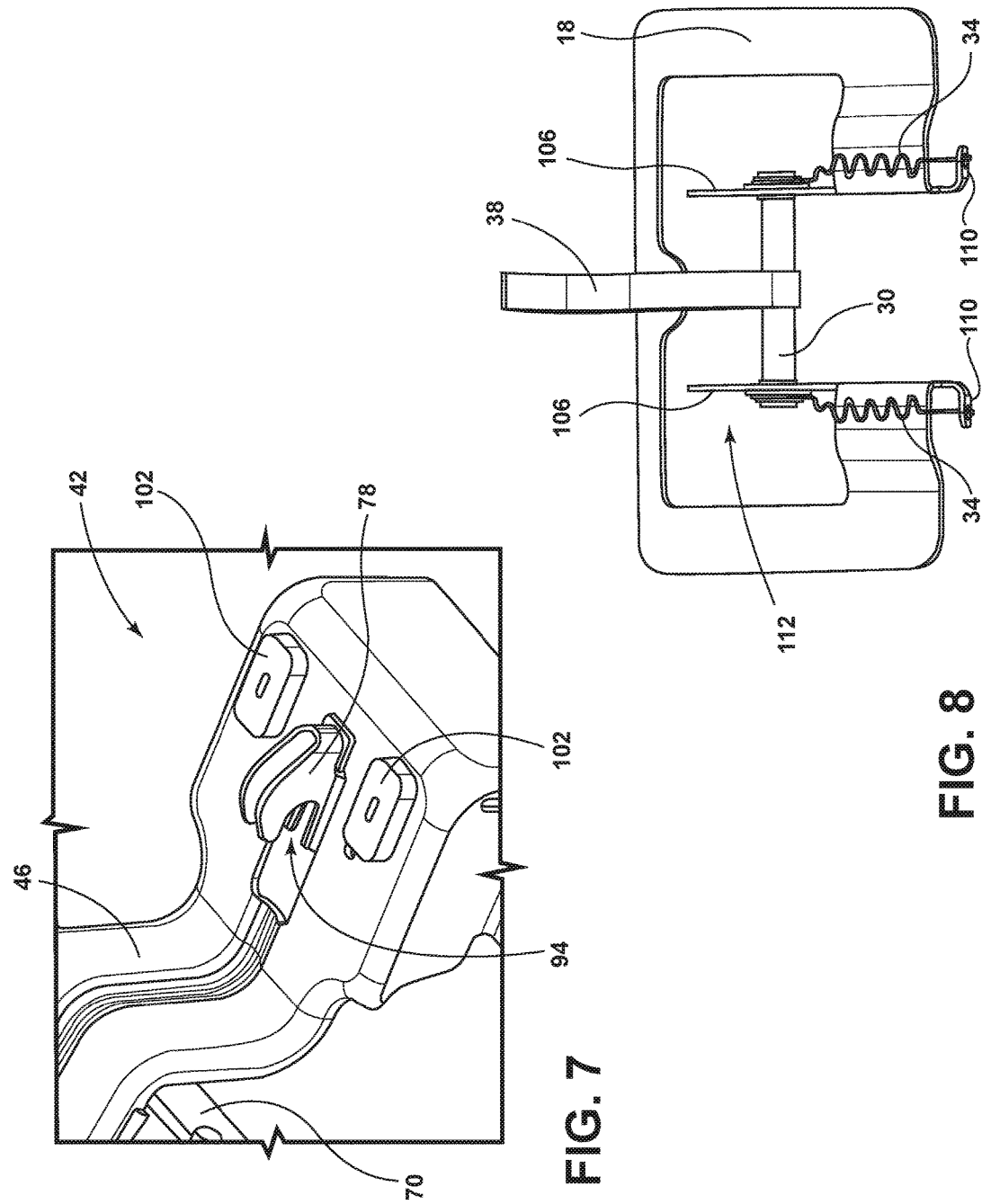

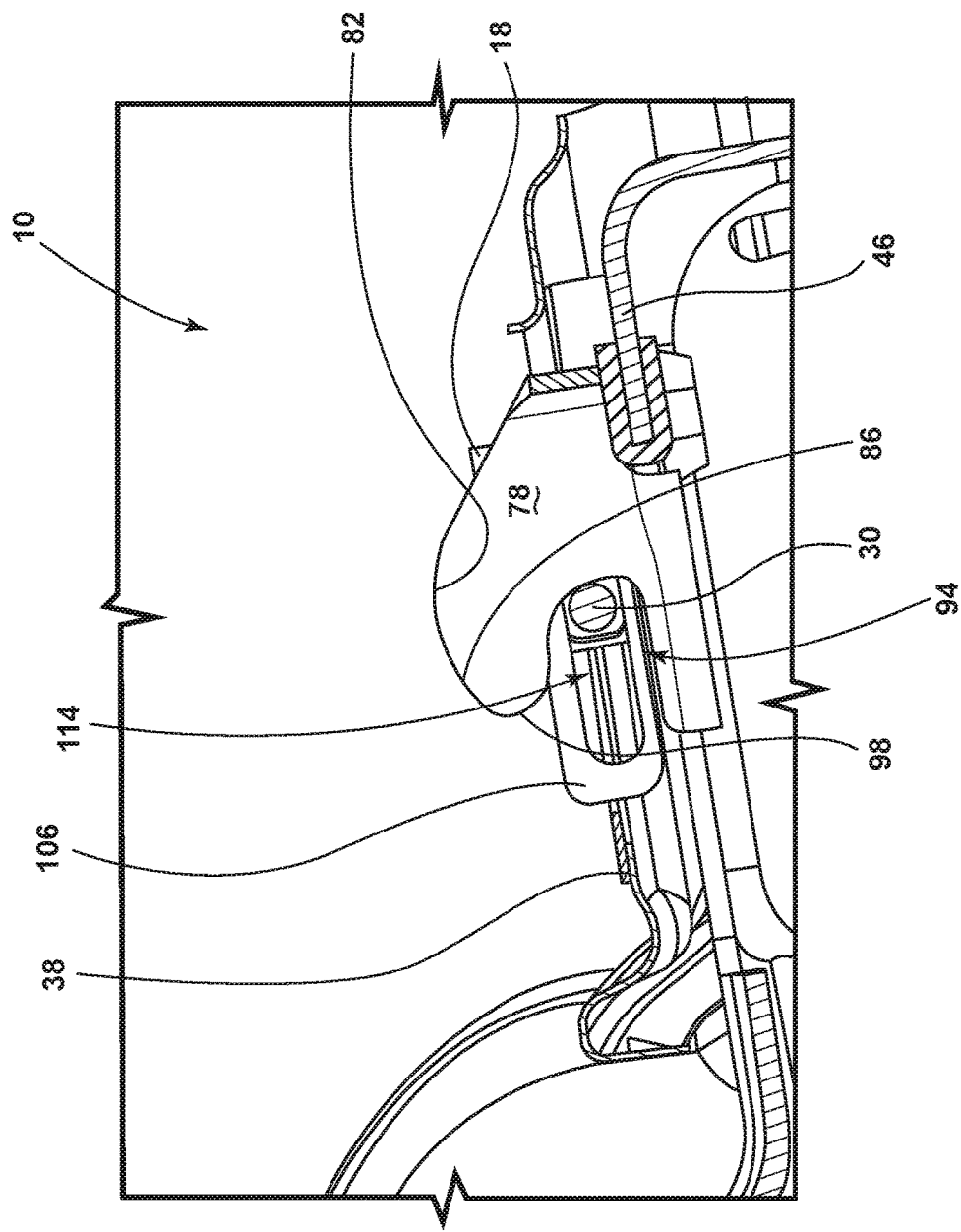

SEAT FLIP UP CUSHION LATCH

FIELD OF THE INVENTION

The present invention generally relates to a latch assembly for a vehicle seat, and more specifically, to a latch assembly adapted to easily attach or remove seat bottoms in a vehicle.

BACKGROUND OF THE INVENTION

Vehicle seat assemblies are known to have a variety of different assemblies or configurations that allow them to be moved, adjusted, inserted, or removed in a vehicle. In order to maximize space and convenience for a passenger, it may be desirable to have a seating assembly that allows the user to readily lift and remove the seat base to provide additional storage space or related functions in the vehicle.

Accordingly, there is a need for improved options available to users to adjust or remove a vehicle seat to maximize space in a vehicle.

SUMMARY OF THE INVENTION

According to one aspect of the present invention, a latch assembly for a vehicle seat is provided. The latch assembly includes a cushion latch coupled to a cushion pan wherein the cushion latch includes a support bracket and a pin wherein the pin is coupled to at least one resilient element and a pull strap and a latch catch bracket coupled to a support arm. The pin of the cushion latch engages the latch catch bracket to immobilize the cushion pan.

Embodiments of the first aspect of the invention can include any one or a combination of the following features:
- the resilient element is a spring;
- the latch catch bracket includes a receiving member to position the pin when the cushion pan is immobilized;
- the latch catch bracket includes an angled edge to help guide and extend the pin of the catch bracket to a receiving member;
- the support arm is a rear riser cushion support bracket;
- the vehicle seat is a captain seat, a 40/60 second row seat, a bench second row seat, a 40/60 third row seat, a bench third row seat, or a combination thereof;
- a pin channel positioned in at least two pin support members of the cushion latch;
- the latch catch bracket includes an angled edge with a rounded peak to help guide and extend the pin of the catch bracket to a receiving member;
- the cushion latch and the cushion pan are a single molded or injected piece having the pin coupled separately; and
- a front hinge member coupled to the cushion pan to rotatably couple a front portion of the vehicle seat.

According to another aspect of the present invention, a latch assembly is provided. The latch assembly includes a cushion latch including a support bracket and a pin wherein the pin is coupled to at least one resilient element and a pull strap and a latch catch bracket coupled to a support arm. The pin of the cushion latch can reversibly couple the latch catch bracket using the pull strap.

Embodiments of the second aspect of the invention can include any one or a combination of the following features:
- the resilient element is a spring;
- the latch catch bracket includes an angled edge with a rounded peak to help guide and extend the pin of the catch bracket to a receiving member;
- the support arm is a rear riser cushion support bracket; and
- the latch catch bracket includes a receiving member to position the pin when a cushion pan is immobilized.

According to another aspect of the present invention, a method of removing and/or attaching a vehicle seat cushion is provided. The method includes pulling a pull strap to retract a pin of a cushion latch from a latch catch bracket, and lifting the pull strap to remove the seat cushion, or lowering the seat cushion to push the pin against an angled edge of the latch catch bracket to position the pin in a receiving member to attach the seat cushion.

Embodiments of the third aspect of the invention can include any one or a combination of the following features:
- sliding the pin through a pin channel positioned in at least two pin support members of the cushion latch as the pin is pushed against the angled edge of the latch catch bracket;
- retracting the pin through a pin channel positioned in at least two pin support members of the cushion latch when pulling the pull strap; and
- the seat cushion is coupled to a cushion pan.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 7 is an isolated perspective view of the latch catch bracket according to some aspects of the present disclosure;

FIG. 8 is an isolated perspective view of the cushion latch according to some aspects of the present disclosure;

FIGS. 10A-10C are a set of cross-sectional views of the latch assembly being assembled according to some aspects of the present disclosure.

DETAILED DESCRIPTION OF THE PREFERRED EMBODIMENTS

Figure 1:
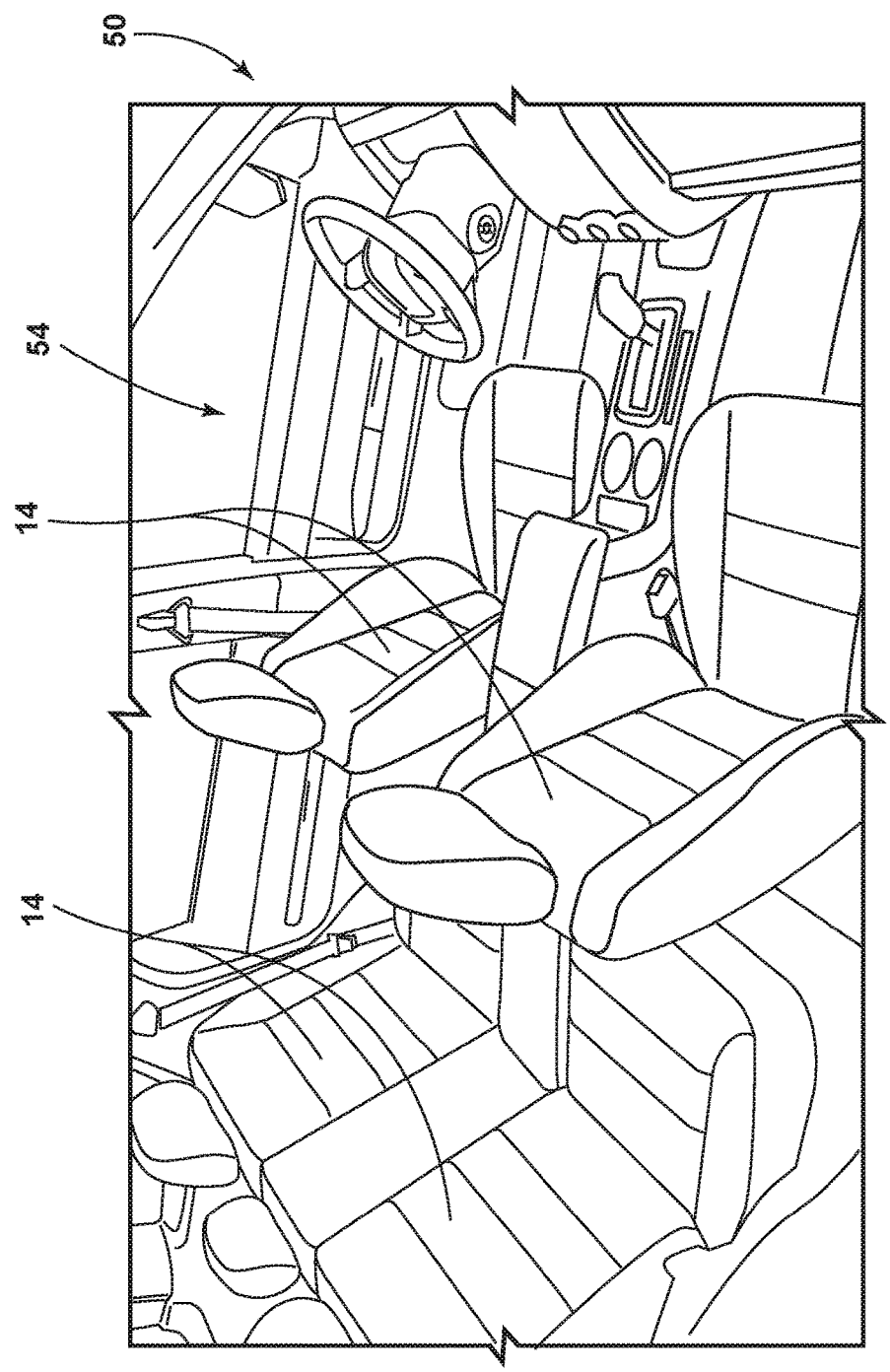
FIG. 1 is a perspective view of a passenger compartment in a vehicle showing several vehicle seats according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary.

It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-10C, reference numeral 10 generally designates a latch assembly. The latch assembly 10 can be used for a vehicle seat 14 where the latch assembly 10 includes a cushion latch 18 coupled to a cushion pan 22 where the cushion latch 18 includes a support bracket 26 and a pin 30. The pin 30 may be coupled to at least one resilient element 34 and a pull strap 38. The latch assembly 10 additionally includes a latch catch bracket 42 coupled to a support arm 46 where the pin 30 of the cushion latch 18 engages the latch catch bracket 42 to immobilize the cushion pan 22.

Figure 4:
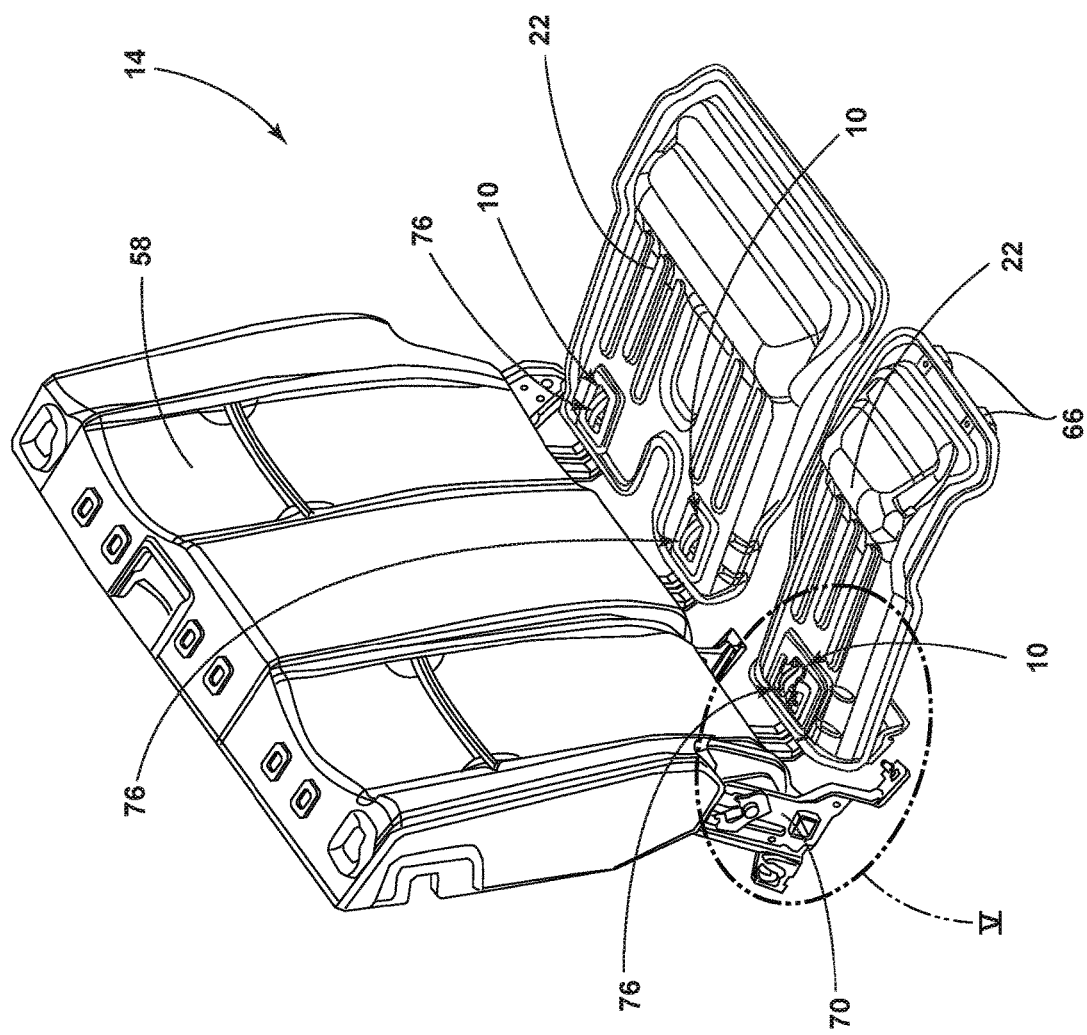
FIG. 4 is a schematic view of a vehicle seat having a cushion pan attached to a seatback according to one aspect of the present disclosure.

Referring to FIG. 1, a wheeled automotive vehicle 50 is provided having a passenger compartment 54. The vehicle 50 is shown as a car although the type of vehicle 50 is not meant to be limiting and the vehicle 50 could additionally be, for example, a minivan, truck, commercial vehicle, or any other wheeled motorized vehicle. The passenger compartment 54 includes one or more vehicle seats 14. As illustrated in FIG. 1, the latch assembly 10 (as shown in FIG. 4) used with the vehicle seat 14 is generally designed for use as a cushion latch in a car, pickup truck, or other motorized vehicle. Additionally, it is contemplated that the latch assembly 10 may be used with various split-seat configurations, including 50/50 seating arrangements, 40/60 seating arrangements, etc. In some aspects, the vehicle seat 14 is a captain seat, a 40/60 second row seat, a bench second row seat, a 40/60 third row seat, a bench third row seat, or a combination thereof.

Figure 2:
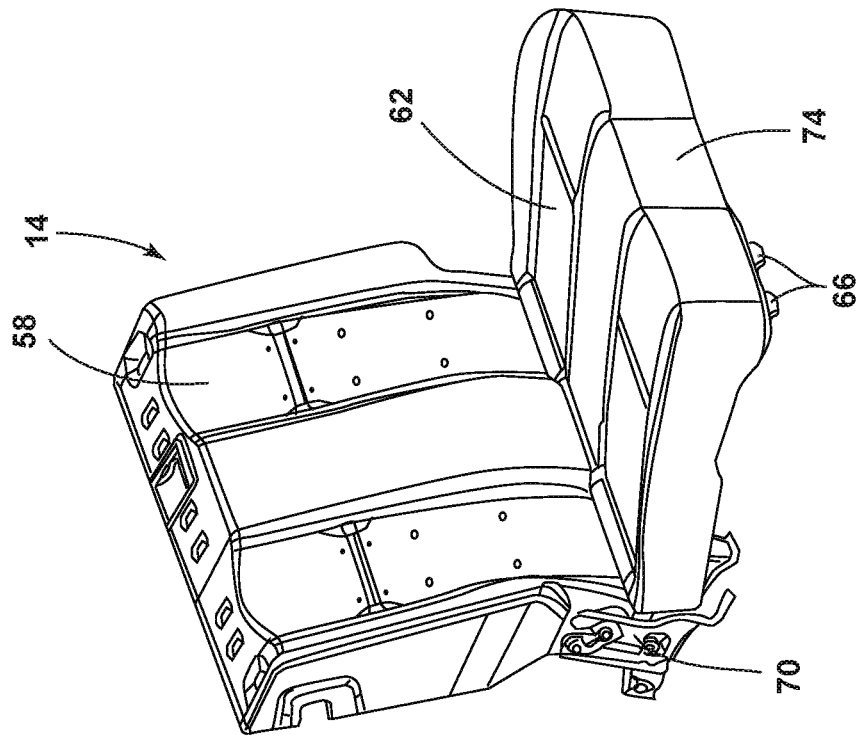
FIG. 2 is a schematic view of a vehicle seat according to one aspect of the present disclosure.

Referring to FIG. 2, a perspective view of the vehicle seat 14 is provided. The vehicle seat 14 includes a seatback 58 and a seat bottom 62 where the seat bottom 62 may include a seat cushion 74. The seatback 58 and the seat bottom 62 may be supported and/or coupled using a seat base member 70. As shown in FIG. 2, the vehicle seat 14 is shown as a 40/60 second row seating arrangement.

Figure 3:
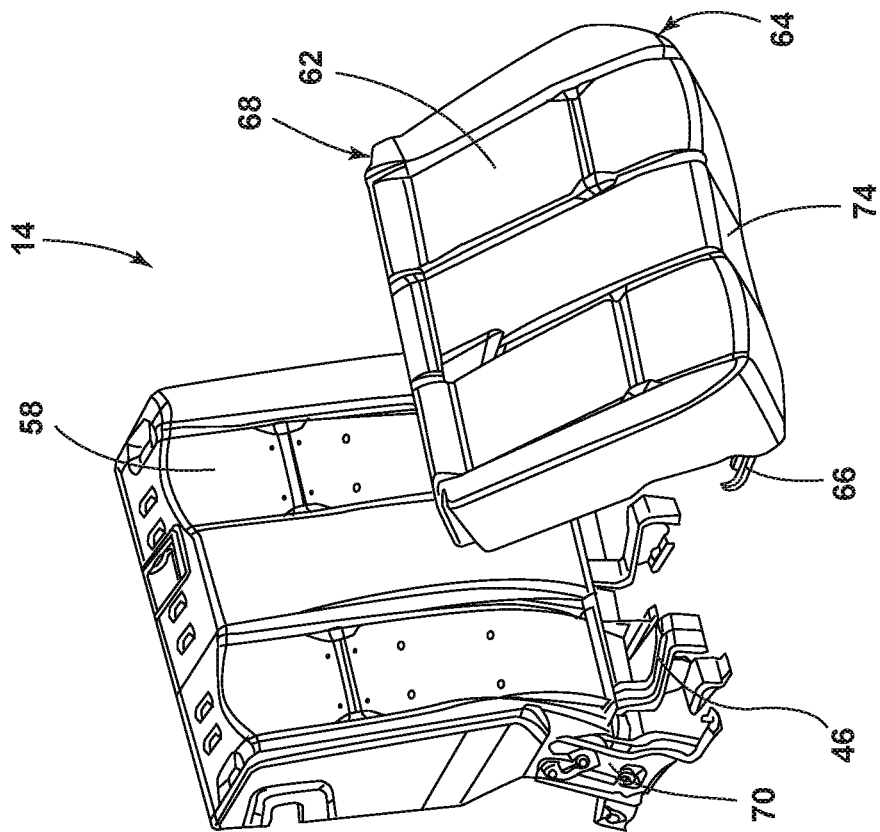
FIG. 3 is a schematic perspective view of a vehicle seat with the seat bottom detached according to one aspect of the present disclosure.

Referring to FIG. 3, a perspective view of the vehicle seat 14 provided in FIG. 2 is shown with the seat bottom 62 detached from the seat base member 70 and seatback 58. As shown, the seat bottom 62 includes a front hinge member 66 that can be used to couple a front portion 64 of the seat bottom 62 to a floor of the vehicle 50. A rear portion 68 of the seat bottom 62 may be positioned on top of a support arm 46 coupled to the seat base member 70. The support arm 46 may additionally have the latch catch bracket 42 (as shown in FIG. 7) and hook member 78 (shown in FIG. 6) operatively coupled to its top surface. In some aspects, the support arm 46 is a rear riser cushion support bracket. As illustrated in FIG. 3, the seat bottom 62 may be rotatably coupled to the floor of the vehicle 50 through the front hinge member 66. As the rear portion 68 of the seat bottom 62 is lifted away from the support arm 46 of the seat base member 70, the front portion 64 remains coupled to the floor of the vehicle 50 through the front hinge member 66. Once the rear portion 68 is lifted, the front hinge member 66 may be uncoupled and removed from the floor to remove the seat bottom 62 completely from the vehicle 50.

The support arm 46 may have a variety of different configurations and may be coupled and/or positioned to a variety of different surfaces depending on the design and application of the vehicle seat 14. In some aspects, as illustrated in FIG. 3, the support arm 46 may be coupled to the seat base member 70. In other aspects, the support arm 46 may be coupled to the flooring or floor pan. In still other aspects, the support arm 46 may be coupled to the frame of the seat 14. The positioning of the support arm 46 is not meant to be limiting and may be coupled to any location as would be understood by one skilled in the art.

Referring now to FIG. 4, the latch assembly 10 is shown coupling the cushion pan 22 to the seat base member 70 of the vehicle seat 14. In some aspects, the cushion pan 22 is used in combination with the seat cushion 74 to form the seat bottom 62 (as shown in FIG. 2) of the vehicle seat 14. The cushion pan 22 may be coupled to the seat cushion 74 using an adhesive known in the art and/or using an outer cover to sandwich the cushion pan 22 and seat cushion 74 together. In some aspects, the cushion pan 22 may be made from a metal or a polymeric material including a thermoplastic or thermoset. As illustrated, a pan opening 76 positioned near the rear portion of the cushion pan 22 is used to mount and position the latch assembly 10. To better view the latch assembly 10, the seat cushion 74 has been removed to show the latch assembly 10 coupled to the cushion pan 22 and the seat base member 70. In some aspects, the cushion latch 18 and the cushion pan 22 are a single molded or injected piece having the pin 30 coupled separately.

The number and placement of the latch assemblies 10 may be varied depending on the design and positioning of the vehicle seat 14 in the vehicle 50. In some aspects, there may be one latch assembly 10 for the respective cushion pan 22 as illustrated in the left portion of the vehicle seat 14 provided in FIG. 4. In other aspects, there may be two latch assemblies 10, as illustrated for the right portion of the vehicle seat in FIG. 4, used to couple the cushion pan 22 and/or seat cushion 74 to the support bracket 26 (FIG. 6) of the seat base member 70. In other aspects, there may be one or more latch assemblies 10 used to couple the cushion pan 22 and/or seat cushion 74 to the support bracket 26 of the seat base member 70.

Figure 5:
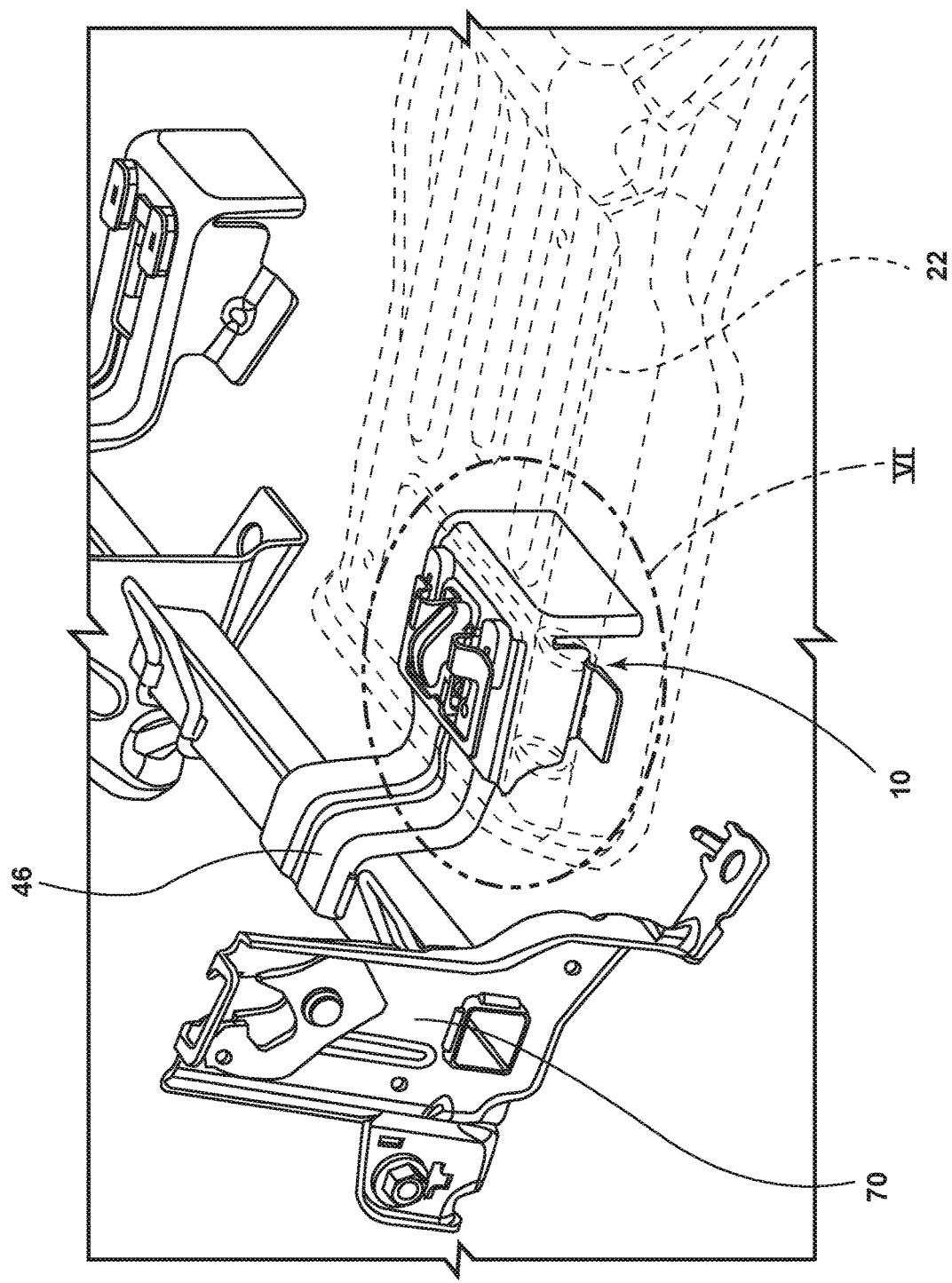
FIG. 5 is an exploded view of the latch assembly provided in FIG. 4 according to some aspects of the present disclosure.

Referring now to FIG. 5, an exploded view of the latch assembly 10 shown in FIG. 4 is provided. As illustrated, the latch assembly 10 is positioned and coupled along the support arm 46 of the seat base member 70 and around an outer edge of the pan opening 76 (FIG. 4) in the cushion pan 22. Once the latch assembly 10 is coupled, the cushion pan 22 may additionally be supported or rest on the support arm 46 of the seat base member 70.

Figure 6:
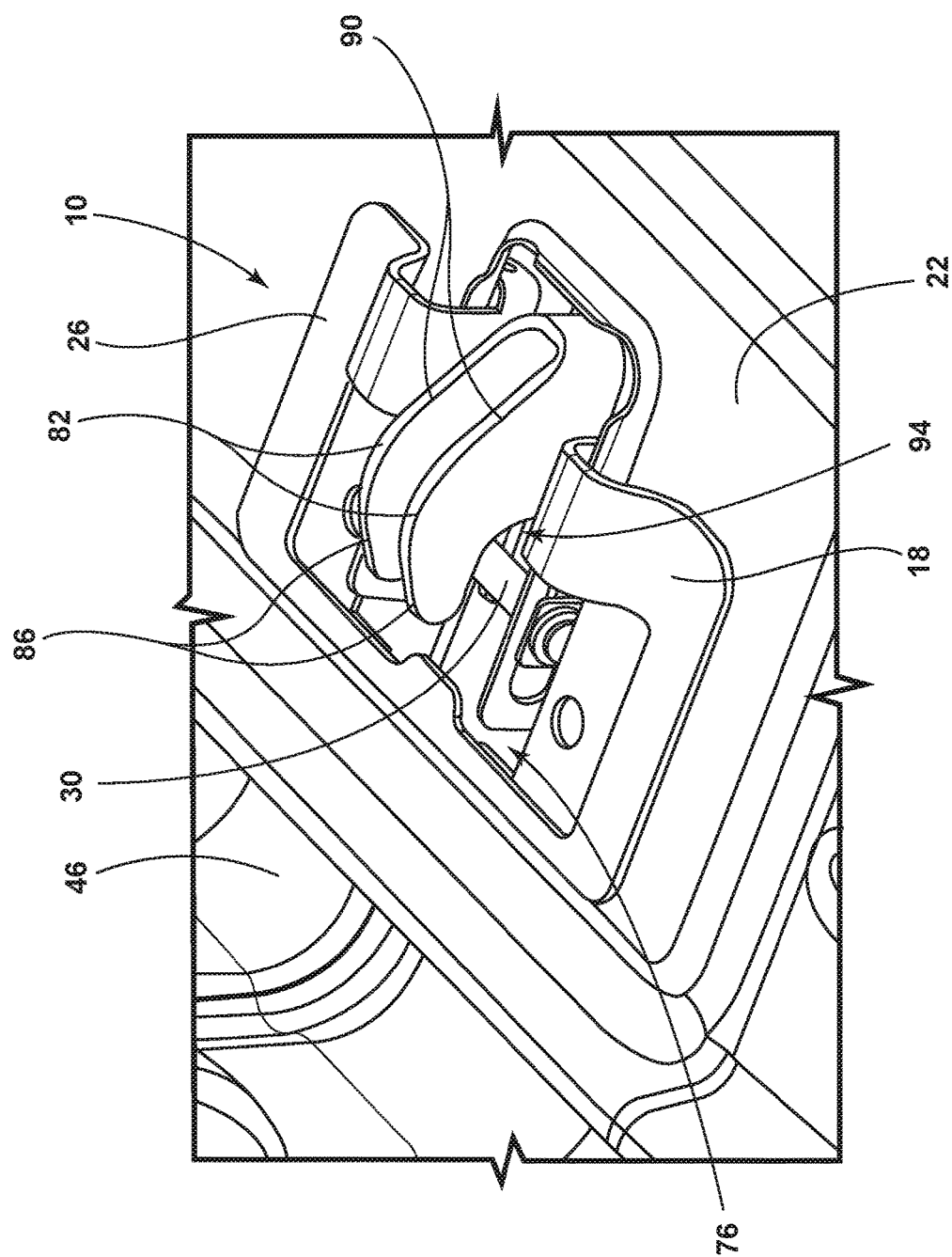
FIG. 6 is an exploded view of the latch assembly provided in FIG. 5 according to some aspects of the present disclosure.
Figure 10A:
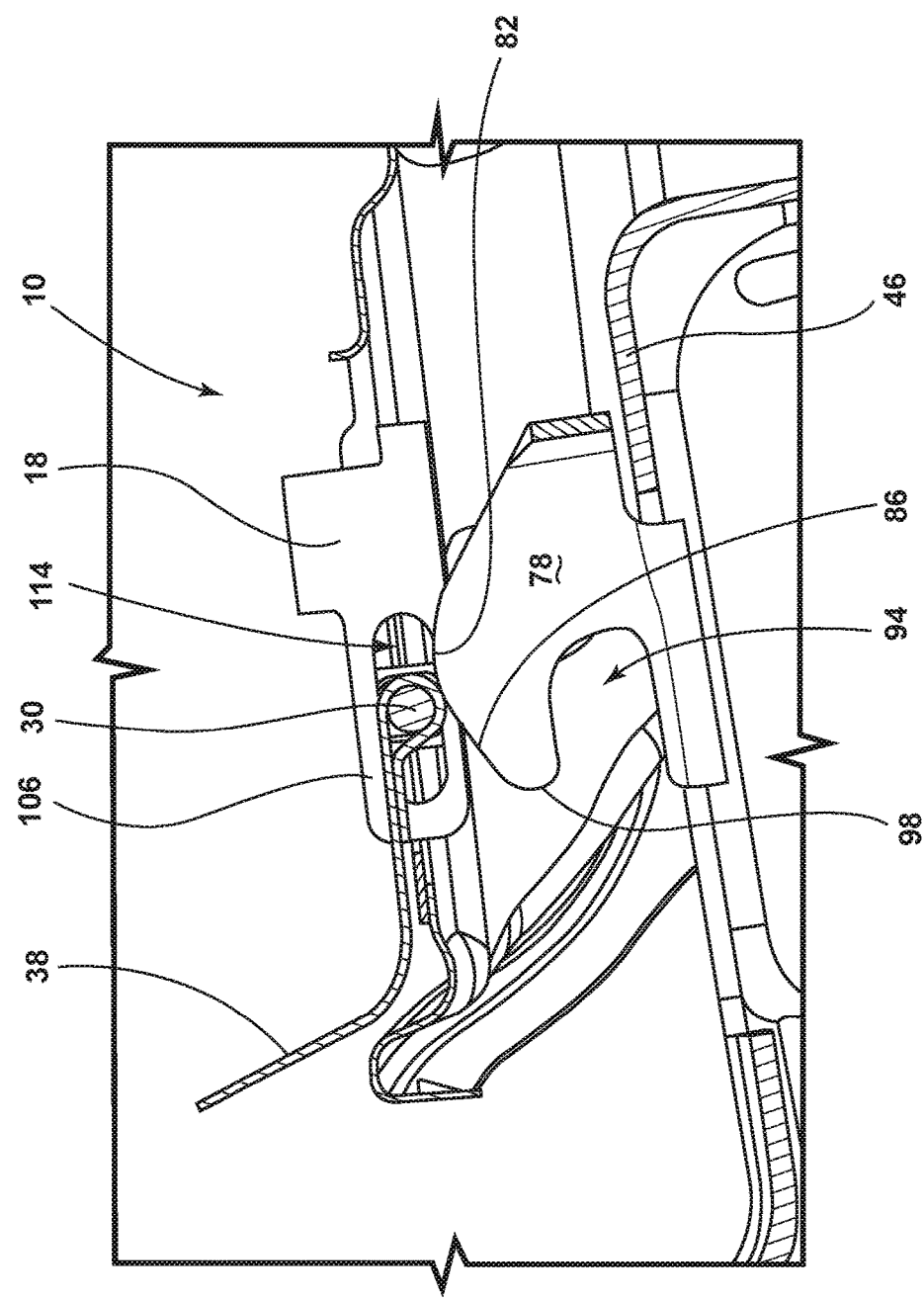

Referring now to FIG. 6, an exploded view of the latch assembly 10 provided in FIG. 5 is provided. The latch assembly 10 includes the cushion latch 18 coupled to the outer edge of the pan opening 76 in the cushion pan 22. The cushion latch 18 includes the support bracket 26 and the pin 30 positioned in a receiving member 94 of the hook member 78. The hook member 78 includes a rounded peak 82 that slopes into an angled edge 86 and a rear angled edge 90 where the angled edge 86 terminates at a rounded point 98 (FIG. 10A). In some aspects, the latch catch bracket 42 includes the receiving member 94 to position the pin 30 when the cushion pan 22 is immobilized. In some aspects, the latch catch bracket 42 includes the angled edge 86 to help guide and extend the pin 30 of the catch bracket 42 to the receiving member 94. The latch assembly 10, as previously described, couples the cushion pan 22 to the support arm 46. In some aspects, the hook member 78 may include two or more hook member 78 plates that can be symmetrical and mirror images of each other where the hook member 78 plates are positioned parallel to each other and offer the option of distributing the force generated from the pin 30 being positioned in the receiving member 94 of the hook member 78.

Referring to FIG. 7, the latch catch bracket 42 is provided where the latch catch bracket 42 includes one or more spacers 102 and the hook member 78 having the receiving member 94. The latch catch bracket 42 is coupled to the support arm 46 of the seat base member 70. The one or more spacers 102 may be made from a rubber or other type of flexible and/or elastic material known in the art. The one or more spacers 102 may be used to cushion the coupling surfaces of the latch catch bracket 42 and the cushion latch 18 (FIG. 8). The receiving member 94 is illustrated as round edged cutout formed by the inner edge of the hook member 78. In some aspects, the receiving member 94 may include a circular cutout, a rectangular cutout, a rounded edge cutout, or any other type of cutout that could position the pin 30 (shown in FIG. 8) of the cushion latch 18. The latch catch bracket 42 in combination with the support arm 46 may provide a flat surface on which the cushion latch 18 and corresponding cushion pan 22 and/or seat cushion 74 may be positioned for support.

Referring now to FIG. 8, the cushion latch 18 is provided. The cushion latch 18 includes the pin 30 positioned in a pin support member 106 where the pin 30 is coupled to the resilient member 34. The resilient member 34 couples the pin 30 to a resilient element attachment member 110. Additionally, the pull strap 38 is coupled to the pin 30 to allow a user to extend the pin 30 out away from the resilient element attachment member 110 so the cushion latch 18 may be removed or decoupled from the latch catch bracket 42 (FIG. 7). In some aspects, the pull strap 38 may be a variety of different lengths and may be made from a variety of different materials depending on the final seat design and access points to the user. A latch opening 112 is defined by the at least three sides of the cushion latch 18 and provides a space for the hook member 78 (FIG. 7) to be positioned and engage the pin 30. In some aspects, the resilient element 34 may include a spring, a rubber band, or any other type of elastomeric material or article known in the art that may be used to reversibly position the pin 30 in the pin channel 114 (FIG. 9) defined by the pin support member 106. In some aspects, the resilient element 34 is a spring.

Depending on the vehicle seat 14 design and positioning in the vehicle 50, the pull strap 38 may be accessible to the user in a variety of different configurations. In some aspects, the pull strap 38 may extend from the pin 30 around the back of the seat bottom 62 and further extend up between the rear portion 68 of the seat bottom 62 and the seat back 58 so the pull strap 38 is sandwiched between the seat back and bottom 58, 62 to be accessible to the user. In other aspects, the pull strap 38 may extend from the pin 30 out towards the rear of the vehicle seat 14 so the pull strap 38 may be accessible to the user from a rearward position relative to the vehicle seat 14.

Figure 9:
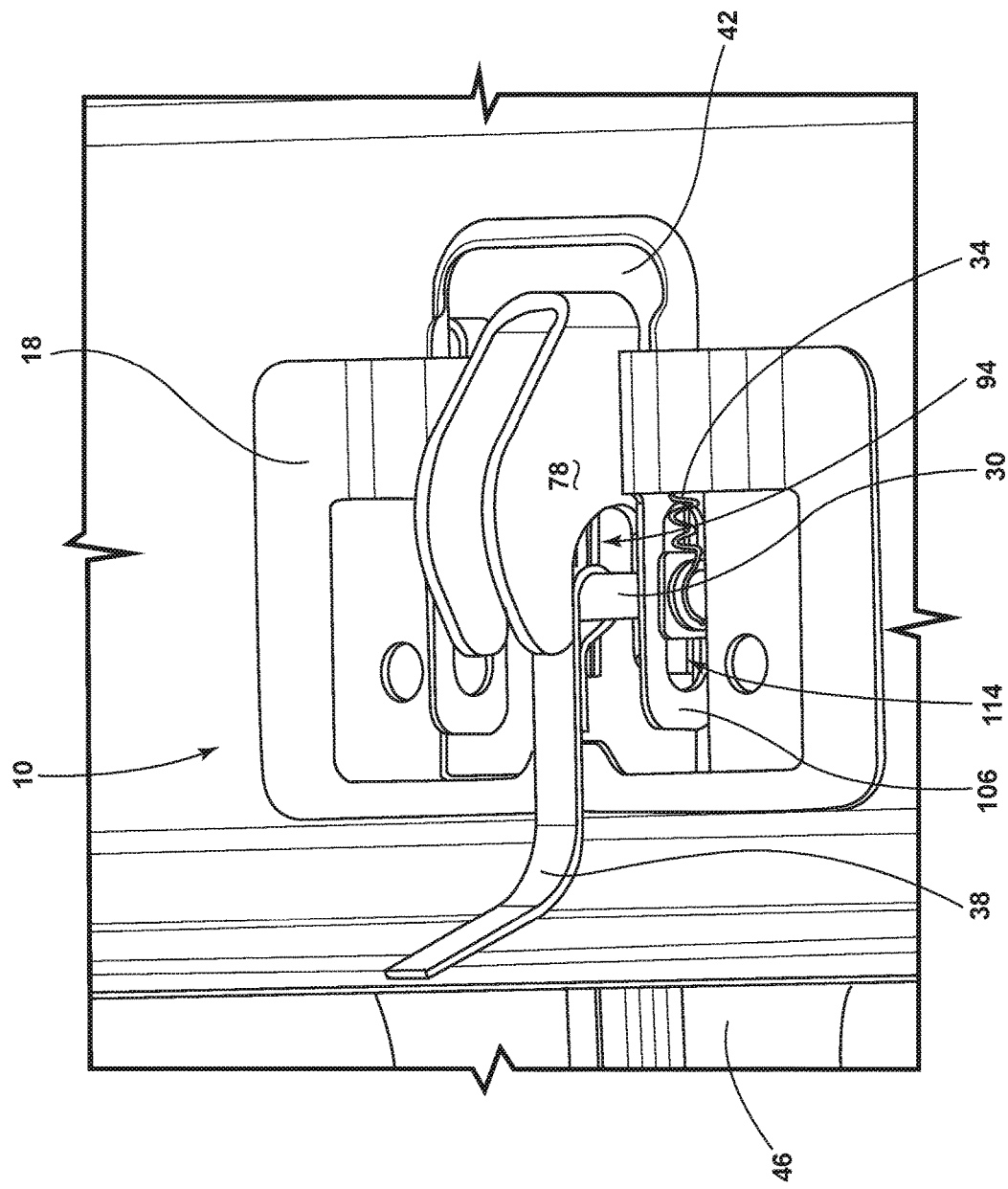
FIG. 9 is a top view of the latch assembly according to some aspects of the present disclosure.

Referring to FIG. 9, a top view of the latch assembly 10 is provided. The latch assembly 10 includes the cushion latch 18 coupled to the pin 30 positioned in a pin channel 114 defined by the surrounding pin support member 106. The hook member 78 forms the receiving member 94 that positions the pin 30 of the cushion latch 18 into place. The pull strap 38 is coupled to the pin 30 so the user may extend the resilient member 34 to extend the pin 30 out along the pin channel 114 to remove the pin 30 from the receiving member 94. Upon sliding the pin 30 out of the receiving member 94, the user may lift the seat back 58 (see FIG. 2) up and away from the seat base member 70 to remove the cushion pan 22 and/or seat cushion 74 (as shown in FIGS. 2 and 4). In some aspects, the pin channel 114 is positioned in at least two pin support members 106 of the cushion latch 18.

Figure 10B:
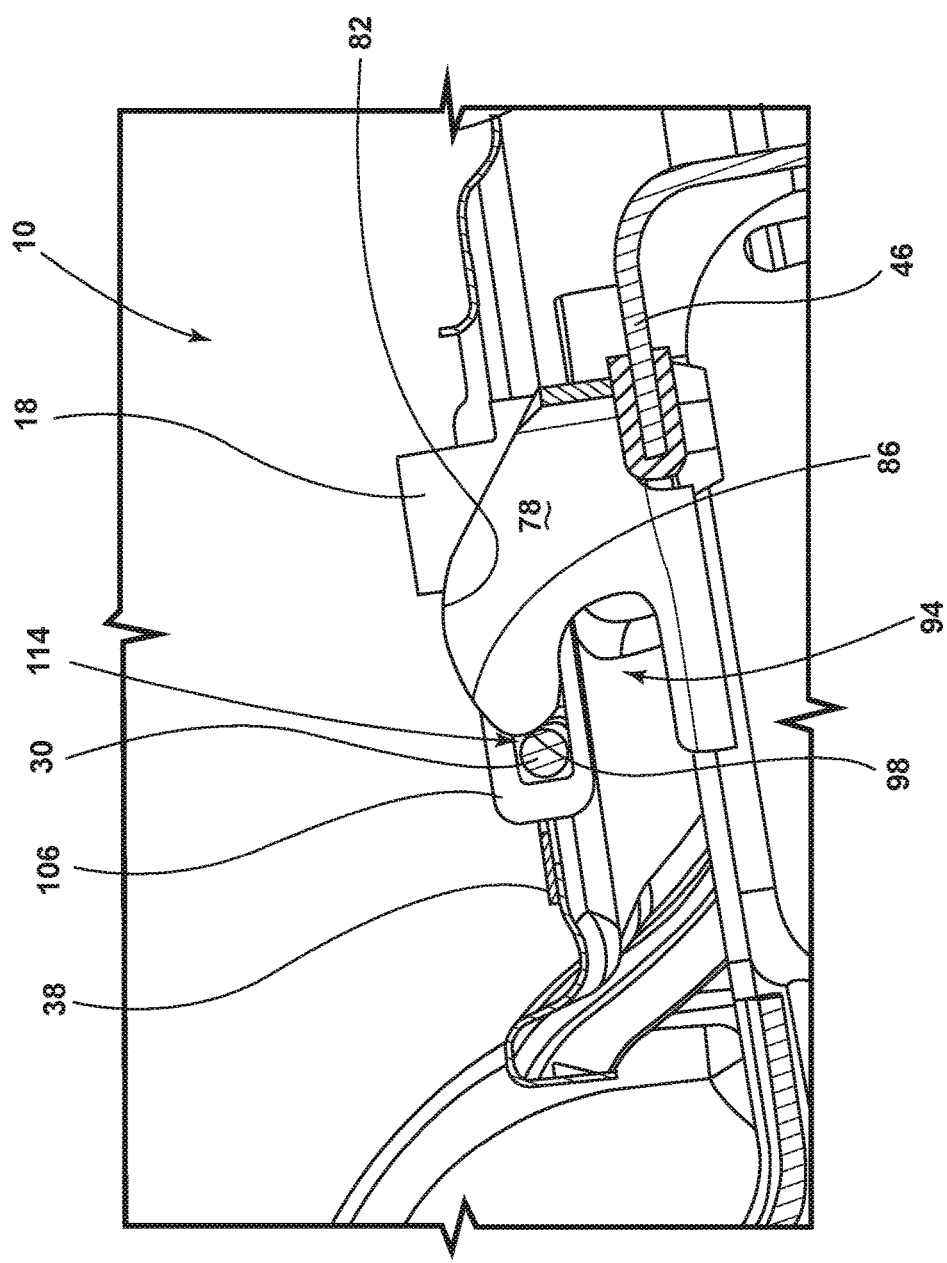

Referring to FIGS. 10A-10C, the latch catch bracket 42 is designed to repeatedly install and remove the seat cushion 74 (FIG. 2) and corresponding cushion pan 22 (FIG. 4) from the vehicle seat 14. As illustrated in the progression from FIG. 10A to FIG. 10C, the seat cushion 74 is installed onto the vehicle seat 14 using the latch assembly 10. Referring to FIG. 10A, the pin 30 of the cushion latch 18 may be contacted with the rounded peak 82 of the latch catch bracket 42 (FIG. 7). As a downward force is applied to the seat cushion 74 and/or cushion pan 22, the pin 30 may slide down the angled edge 86 of the hook member 78 and exert a pulling force against the resilient element 34 (FIG. 9) as the pin 30 slides down the pin channel 114 of the pin support member 106. Referring now to FIG. 10B, once the pin 30 slides down the angled edge 86 of the hook member 78 to reach the rounded point 98, the resilient element 34 is extended or stretched to its maximum length. Referring now to FIG. 10C, as the user continues to apply a downward force to the seat cushion 74 and/or cushion pan 22, the pin 30 flips or rotates over the rounded point 98 and the resilient element 34 may retract the pin 30 into the receiving member 94 of the hook member 78. Upon the positioning of the pin 30 into the receiving member 94 of the hook member 78, the seat cushion 74 is installed and secured for travel. Once the seat cushion 74 is in the installed positioned as illustrated in FIG. 10C, the seat cushion 74 and/or cushion pan 22 may be additionally supported by the support arm 46 of the seat base member 70 (FIG. 2).

Figure 11:
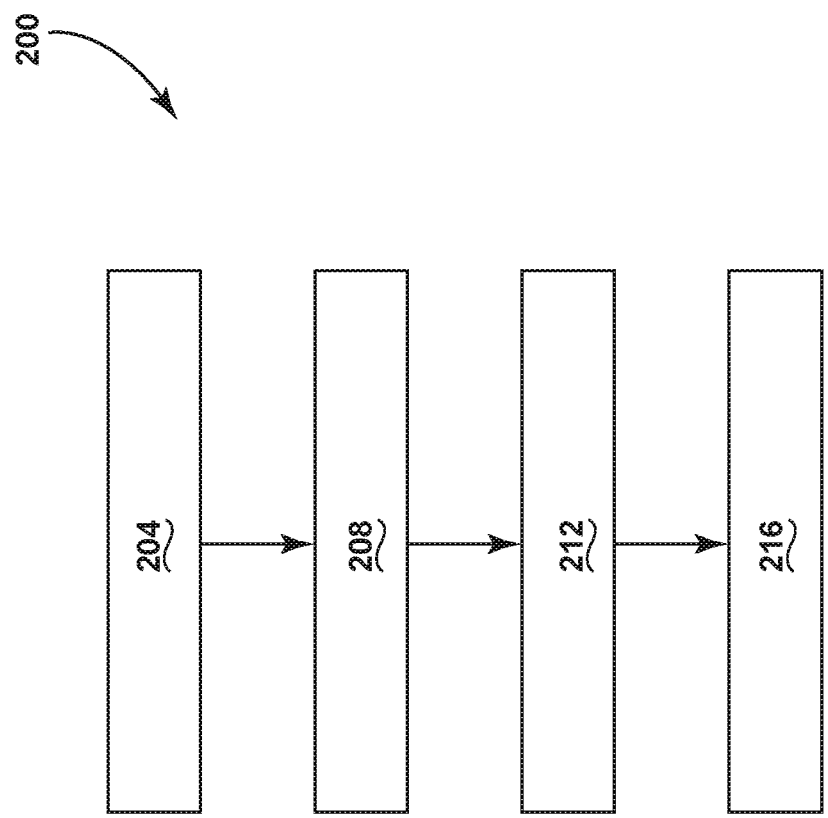
FIG. 11 is a flow diagram of a method of removing and/or attaching a vehicle seat cushion according to some aspects of the present disclosure.

Referring to FIG. 11, with continued reference to FIGS. 1-10C, a method 200 of removing and/or attaching the vehicle seat cushion 74 is shown. Beginning with a fully assembled vehicle seat 14, the method 200 may begin with a step 204 that includes pulling the pull strap 38 to retract the pin 30 of the cushion latch 18 from the latch catch bracket 42.

Next is a step 208 of lifting the pull strap 38 to remove the seat cushion 74. As generally outlined and described in FIG. 3, upon lifting the pull strap 38, the seat bottom 62 may be rotatably coupled to the floor of the vehicle 50 through the front hinge member 66. As the rear portion 68 of the seat bottom 62 is lifted away from the support arm 46 of the seat base member 70, the front portion 64 remains coupled to the floor of the vehicle 50 through the front hinge member 66. Once the rear portion 68 is lifted, the front hinge member 66 may be uncoupled and removed from the floor to remove the seat bottom 62 completely from the vehicle 50.

Next is a step 212 of lowering the seat cushion 74 to push the pin 30 against the angled edge 86 of the latch catch bracket 42 to position the pin 30 in the receiving member 94 to attach the seat cushion 74. As generally outlined and described in FIGS. 10A-10C, the user can apply a downward force to the seat cushion 74 so the pin 30 can slide down the angled edge 86 of the hook member 78 beginning at the rounded peak 82. As the pin 30 flips or rotates over the rounded point 98, the resilient element 34 may retract or snap back the pin 30 into the receiving member 94 of the hook member 78. Upon the positioning of the pin 30 into the receiving member 94 of the hook member 78, the seat cushion 74 is installed and secured for travel.

Next is a step 216 where a user can repeat steps 208 and 212 to repeatedly remove and install the seat cushion 74 onto the vehicle seat 14.

It is understood that the descriptions outlining and teaching the latch assembly 10 previously discussed, which can be used in any combination, apply equally well to the method 200 for removing and/or attaching a vehicle seat cushion 74.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A latch assembly for a vehicle seat comprising:
   a cushion latch coupled to a cushion pan wherein the cushion latch includes a support bracket and a pin wherein the pin is coupled to at least one resilient element and a pull strap; and
   a latch catch bracket coupled to a support arm and including an angled edge to help guide and extend the pin of the catch bracket to a receiving member;
   wherein the pin of the cushion latch engages the latch catch bracket to immobilize the cushion pan.

2. The latch assembly of claim 1, wherein the at least one resilient element is a spring.

3. The latch assembly of claim 1, wherein the latch catch bracket includes a receiving member to position the pin when the cushion pan is immobilized.

4. The latch assembly of claim 1, wherein the support arm is a rear riser cushion support bracket.

5. The latch assembly of claim 1, wherein the vehicle seat is a captain seat, a 40/60 second row seat, a bench second row seat, a 40/60 third row seat, a bench third row seat, or a combination thereof.

6. The latch assembly of claim 1, further comprising:
   a pin channel positioned in at least two pin support members of the cushion latch.

7. The latch assembly of claim 1, wherein the latch catch bracket includes the angled edge with a rounded peak to help guide and extend the pin of the catch bracket to the receiving member.

8. The latch assembly of claim 1, wherein the cushion latch and the cushion pan are a single molded or injected piece having the pin coupled separately.

9. The latch assembly of claim 1, further comprising:
   a front hinge member coupled to the cushion pan to rotatably couple a front portion of the vehicle seat.

10. A latch assembly comprising:
    a cushion latch including a support bracket and a pin wherein the pin is coupled to at least one resilient element and a pull strap; and
    a latch catch bracket coupled to a support arm and including an angled edge with a rounded peak to help guide and extend the pin of the catch bracket to a receiving member;
    wherein the pin of the cushion latch can reversibly couple the latch catch bracket using the pull strap.

11. The latch assembly of claim 10, wherein the at least one resilient element is a spring.

12. The latch assembly of claim 10, wherein the support arm is a rear riser cushion support bracket.

13. The latch assembly of claim 10, wherein the latch catch bracket includes a receiving member to position the pin when a cushion pan is immobilized.

14. A method of removing and/or attaching a vehicle seat cushion, the method comprising:

pulling a pull strap to retract a pin of a cushion latch from a latch catch bracket; and lifting the pull strap to remove the seat cushion; or lowering the seat cushion to push the pin against an angled edge of the latch catch bracket to position the pin in a receiving member to attach the seat cushion; and sliding the pin through a pin channel positioned in at least two pin support members of the cushion latch as the pin is pushed against the angled edge of the latch catch bracket.

15. The method of claim 14, wherein the step of lowering the seat cushion comprises lowering the seat cushion to push the pin against the angled edge having a rounded peak which helps guide and extend the pin of the catch bracket to the receiving member.

16. The method of claim 14, further comprising:

retracting the pin through a pin channel positioned in at least two pin support members of the cushion latch when pulling the pull strap.

17. A method of removing and/or attaching a vehicle seat cushion, the method comprising:

pulling a pull strap to retract a pin of a cushion latch from a latch catch bracket; and lifting the pull strap to remove the seat cushion; or lowering the seat cushion to push the pin against an angled edge of the latch catch bracket to position the pin in a receiving member to attach the seat cushion, wherein the seat cushion is coupled to a cushion pan.

* * * * *